US012274969B2

(12) United States Patent
Stiehler et al.

(10) Patent No.: US 12,274,969 B2
(45) Date of Patent: Apr. 15, 2025

(54) VEHICLE CABIN FILTER ASSEMBLY (71) Applicant: Dyson Technology Limited, Wiltshire (GB)

(72) Inventors: Daniela Stiehler, Gloucester (GB); James Sebastian Harding, Swindon (GB); Timothy James Godfrey, Bristol (GB)

(73) Assignee: Dyson Technology Limited, Malmesbury (GB)

( * ) Notice: Subject to any disclaimer, the term of this patent is extended or adjusted under 35 U.S.C. 154(b) by 853 days.

(21) Appl. No.: 17/258,004

(22) PCT Filed: Jul. 5, 2019

(86) PCT No.: PCT/GB2019/051909
§ 371 (c)(1),
(2) Date: Jan. 5, 2021

(87) PCT Pub. No.: WO2020/008210
PCT Pub. Date: Jan. 9, 2020

(65) Prior Publication Data
US 2021/0275955 A1 Sep. 9, 2021

(30) Foreign Application Priority Data
Jul. 6, 2018 (GB) .................................. 1811156

(51) Int. Cl.
*B01D 46/64* (2022.01)
*B01D 46/00* (2022.01)
(Continued)

(52) U.S. Cl.
CPC ......... *B01D 46/64* (2022.01); *B01D 46/0036* (2013.01); *B01D 46/522* (2013.01);
(Continued)

(58) Field of Classification Search
None
See application file for complete search history.

(56) References Cited

U.S. PATENT DOCUMENTS 2,394,208 A 2/1946 Schaaf
2,792,906 A 5/1957 Evans
(Continued)

FOREIGN PATENT DOCUMENTS

CN 2647625 Y 10/2004
CN 101939074 A 1/2011
(Continued)

OTHER PUBLICATIONS

Geankoplis et al., Transport Processes and Separation Process Principles (Includes Unit Operations)4E (Part 2), East China University of Science and Technology Press, 2007, 3 pages.
(Continued)

*Primary Examiner* — Brit E. Anbacht
(74) *Attorney, Agent, or Firm* — Tucker Ellis LLP; Michael G. Craig (57) ABSTRACT A vehicle cabin filter assembly comprising a housing and a plurality of filter modules mounted to the housing. The filter modules comprise a first filter module, a second filter module positioned downstream of the first filter module, and a third filter module positioned downstream of the second filter module. Each filter module comprises a particulate filter element, and at least one of the filter modules comprises a gas filter element. The second filter module has a separation efficiency higher than the first filter module, and the third filter module has a separation efficiency higher than the second filter module.

10 Claims, 5 Drawing Sheets (51) Int. Cl.
    B01D 46/52 (2006.01)
    B60H 3/06 (2006.01)
(52) U.S. Cl.
    CPC ....... *B60H 3/0658* (2013.01); *B01D 2267/40* (2013.01); *B01D 2279/50* (2013.01); *B60H 2003/0691* (2013.01)

(56) References Cited

U.S. PATENT DOCUMENTS

| | | | |
|---|---|---|---|
| 4,530,817 | A | 7/1985 | Hoelter et al. |
| 4,612,026 | A | 9/1986 | Pollara et al. |
| 4,658,707 | A | 4/1987 | Hawkins et al. |
| 4,744,289 | A | 5/1988 | Hoelter et al. |
| 4,900,344 | A * | 2/1990 | Lansing ............. F24F 1/0071 55/482 |
| 5,002,597 | A | 3/1991 | Gielow et al. |
| 5,192,346 | A | 3/1993 | Kowalczyk |
| 5,338,253 | A | 8/1994 | Damsohn et al. |
| 5,350,443 | A | 9/1994 | Von Bluecher et al. |
| 5,509,950 | A | 4/1996 | Van De Graaf et al. |
| 5,540,617 | A | 7/1996 | Siegel et al. |
| 5,674,302 | A | 10/1997 | Nakayama et al. |
| 6,156,089 | A * | 12/2000 | Stemmer ............. B01D 46/0036 55/467 |
| 6,464,761 | B1 | 10/2002 | Bugli |
| 6,478,858 | B2 | 11/2002 | Angermann et al. |
| 6,758,741 | B2 | 7/2004 | Aoki et al. |
| 8,016,123 | B2 | 9/2011 | Gohle et al. |
| 9,168,481 | B2 | 10/2015 | Wedemann et al. |
| 9,518,487 | B2 | 12/2016 | Coelho Ferreira |
| 9,630,475 | B2 | 4/2017 | Bayerlein et al. |
| 9,669,343 | B2 | 6/2017 | Stinzendoerfer et al. |
| 2002/0166811 | A1 | 11/2002 | Walker et al. |
| 2003/0089092 | A1 * | 5/2003 | Bause ................. B01D 39/163 96/154 |
| 2004/0083697 | A1 | 5/2004 | Niakin |
| 2004/0163540 | A1 | 8/2004 | Mori et al. |
| 2006/0108278 | A1 | 5/2006 | Scholl et al. |
| 2006/0127288 | A1 * | 6/2006 | Hay .................... A61L 9/014 422/186.3 |
| 2007/0175193 | A1 | 8/2007 | Niakan |
| 2007/0270095 | A1 | 11/2007 | Shimoyama et al. |
| 2008/0148946 | A1 | 6/2008 | Lotgerink-Bruinenberg |
| 2010/0269463 | A1 | 10/2010 | Duffy et al. |
| 2012/0067215 | A1 * | 3/2012 | Lindahl ................ B01D 46/521 96/153 |
| 2012/0180664 | A1 | 7/2012 | Lundquist |
| 2014/0013941 | A1 | 1/2014 | Stinzendoerfer et al. |
| 2014/0157990 | A1 | 6/2014 | Piry et al. |
| 2015/0273985 | A1 * | 10/2015 | Luley .................... B01D 46/64 96/134 |
| 2016/0067648 | A1 | 3/2016 | Unger et al. |
| 2016/0296871 | A1 | 10/2016 | Scope et al. |
| 2017/0189847 | A1 | 7/2017 | Hasan et al. |
| 2017/0361684 | A1 | 12/2017 | Stoeßer et al. |
| 2021/0276401 | A1 | 9/2021 | Stiehler et al. |

FOREIGN PATENT DOCUMENTS

| | | | | |
|---|---|---|---|---|
| CN | 102614722 | A | | 8/2012 |
| CN | 202398236 | U | | 8/2012 |
| CN | 104776512 | A | | 7/2015 |
| CN | 103961938 | B | | 8/2015 |
| CN | 105383266 | A | | 3/2016 |
| CN | 105398311 | A | | 3/2016 |
| CN | 205468441 | U | | 8/2016 |
| CN | 106178710 | A | | 12/2016 |
| CN | 106215606 | A | | 12/2016 |
| CN | 205890478 | U | | 1/2017 |
| CN | 106364287 | A | | 2/2017 |
| CN | 205925227 | U | | 2/2017 |
| CN | 205989647 | U | | 3/2017 |
| CN | 206171122 | U | | 5/2017 |
| CN | 105107290 | B | | 6/2017 |
| CN | 106853303 | A | | 6/2017 |
| CN | 107042034 | A | | 8/2017 |
| CN | 107096306 | A | | 8/2017 |
| CN | 107379929 | A | | 11/2017 |
| CN | 206642481 | U | | 11/2017 |
| CN | 105128631 | B | | 12/2017 |
| CN | 107471955 | A | | 12/2017 |
| CN | 206778084 | U | | 12/2017 |
| CN | 207241369 | U | | 4/2018 |
| CN | 108211554 | A | | 6/2020 |
| CN | 112384291 | A | | 2/2021 |
| DE | 3421320 | A1 | | 12/1985 |
| DE | 8815460 | U1 | | 5/1989 |
| DE | 3931914 | A1 | | 4/1991 |
| DE | 10249110 | A1 | | 4/2004 |
| DE | 19805011 | B4 | | 12/2007 |
| DE | 102007050733 | A1 | | 6/2008 |
| DE | 102009019219 | A1 | | 11/2010 |
| DE | 102014000353 | A1 | | 9/2014 |
| DE | 102014016492 | A1 | | 5/2016 |
| DE | 102015016446 | A1 | | 12/2016 |
| DE | 102017219009 | A1 | | 4/2019 |
| EP | 0370222 | A2 | | 5/1990 |
| EP | 0383236 | A1 | | 8/1990 |
| EP | 0564799 | A2 | | 10/1993 |
| EP | 1494881 | A1 | | 10/2003 |
| EP | 2684591 | A1 | | 1/2014 |
| FR | 2838380 | A1 * | 10/2003 | ............. A61L 9/205 |
| FR | 2855072 | A1 | | 11/2004 |
| FR | 2892030 | A1 | | 4/2007 |
| JP | H7-98134 | A | | 4/1995 |
| WO | 03/086793 | A1 | | 10/2003 |
| WO | 2004/062700 | A1 | | 7/2004 |
| WO | 2006/118983 | A2 | | 11/2006 |
| WO | WO-2007116130 | A1 * | 10/2007 | ............. A61L 9/205 |
| WO | WO-2010101520 | A1 * | 9/2010 | ......... B01D 39/1623 |
| WO | 2013/045285 | A1 | | 4/2013 |
| WO | 2014/173984 | A2 | | 10/2014 |
| WO | 2016/150851 | A1 | | 9/2016 |
| WO | 2017/157721 | A1 | | 9/2017 |
| WO | 2017/220415 | A1 | | 12/2017 |
| WO | 2017/220416 | A1 | | 12/2017 |
| WO | 2017/220691 | A1 | | 12/2017 |
| WO | 2018/002062 | A1 | | 1/2018 |
| WO | 2020/008212 | A1 | | 1/2020 |
| WO | 2020/008213 | A1 | | 1/2020 |
| WO | 2020/008215 | A1 | | 1/2020 |

OTHER PUBLICATIONS

Office Action received for Chinese Patent Application No. 201980045234.9, mailed on Mar. 21, 2022, 22 pages (13 pages of English Translation and 9 pages of Original Document).
International Preliminary Report on Patentability received for PCT Patent Application No. PCT/GB2019/051911, mailed on Jan. 21, 2021, 8 pages.
International Preliminary Report on Patentability received for PCT Patent Application No. PCT/GB2019/051912, mailed on Jan. 21, 2021, 8 pages.
International Preliminary Report on Patentability received for PCT Patent Application No. PCT/GB2019/051914, mailed on Jan. 21, 2021, 8 pages.
International Search Report and Written Opinion received for PCT Patent Application No. PCT/GB2019/051911, mailed on Sep. 26, 2019, 12 pages.
International Search Report and Written Opinion received for PCT Patent Application No. PCT/GB2019/051912, mailed on Sep. 26, 2019, 12 pages.
International Search Report and Written Opinion received for PCT Patent Application No. PCT/GB2019/051914, mailed on Sep. 27, 2019, 12 pages.
Office Action received for Chinese Patent Application No. 201980045234.9, mailed on Oct. 18, 2021, 23 pages (12 pages of English Translation and 11 pages of Original Document).
International Search Report and Written Opinion received for PCT Patent Application No. PCT/GB2019/051910, mailed on Sep. 26, 2019, 11 pages.

(56) References Cited

OTHER PUBLICATIONS

Search Report dated Nov. 19, 2018, directed to GB Application No. 1811157.5; 1 page.
International Search Report and Written Opinion mailed Sep. 26, 2019, directed to International Application No. PCT/GB2019/051909; 13 pages.
Search Report dated Nov. 15, 2018, directed to GB Application No. 1811156.7; 2 pages.

* cited by examiner

VEHICLE CABIN FILTER ASSEMBLY

REFERENCE TO RELATED APPLICATIONS

This application is a national phase application under 35 USC 371 of International Application No. PCT/GB2019/051909, filed Jul. 5, 2019, which claims the priority of United Kingdom Application No. 1811156.7, filed Jul. 6, 2018, the entire contents of each of which is incorporated herein by reference.

FIELD OF THE DISCLOSURE

The present disclosure relates to a filter assembly for filtering the air entering the cabin of a vehicle.

BACKGROUND OF THE DISCLOSURE

Vehicle occupants are becoming increasingly conscious of outdoor pollutants that may be drawn into the cabin by the air conditioning system. This is particularly true in cities where the level of exhaust emissions and other pollutants, such as volatile organic compounds, can be high. There is therefore a perceived need to improve the level of filtration provided by the cabin filter.

SUMMARY OF THE DISCLOSURE

The present disclosure provides a vehicle cabin filter assembly comprising a housing and a plurality of filter modules mounted to the housing, wherein the plurality of filter modules comprises a first filter module, a second filter module positioned downstream of the first filter module, and a third filter module positioned downstream of the second filter module, each filter module comprises a particulate filter element, the second filter module has a separation efficiency higher than the first filter module, the third filter module has a separation efficiency higher than the second filter module, and at least one filter module comprises a gas filter element.

The filter assembly therefore comprises three distinct filter modules of successively higher separation efficiency. By employing filter modules of increasing separation efficiency, it is possible to achieve a level of filtration for the filter assembly that is greater than each individual filter module. The filter assembly is therefore able to achieve a relatively high separation efficiency and dust-loading capacity for a relatively modest pressure drop. The pressure drop is an important consideration since a higher pressure drop will require a more powerful blower unit in order to achieve a given flow rate of air into the cabin. In addition to the particulate filter elements, the filter assembly comprises a gas filter element. As a result, the filter assembly is able to remove gases, such as volatile organic compounds, as well as particulates from the air.

The at least one filter module may comprise a further particulate filter element. The particulate filter element is then positioned upstream of the gas filter element, and the further particulate filter element is positioned downstream of the gas filter element. Furthermore, the further particulate filter element has a separation efficiency higher than the particulate filter element. This arrangement then has the advantage that the gas filter element is sandwiched between two particulate filter elements. As a result, the gas filter element is better protected during handling of the filter module, e.g. during manufacture and assembly of the filter assembly. Moreover, by ensuring that the particulate filter elements have different separation efficiencies, better depth loading may be achieved. In particular, the separation efficiencies may be selected such that, as the air moves through the filter module, particulates are removed from the air at the same or similar rate.

The gas filter element may comprise granules of an adsorbent. As a result, a relatively high surface area may be presented by the adsorbent to the air moving through the gas filter element. Additionally, a longer dwell time (i.e. the period of time that the air is in contact with the adsorbent) may be achieved.

The third filter module may provide HEPA-grade filtration. The first and second filter modules act to protect the third filter module by removing a large portion of the particulates from the air. Consequently, the third filter module is required to remove only a small portion of the particulates in order to achieve HEPA-grade filtration. As a result, the third filter module is able to provide HEPA-grade filtration for a relatively low pressure drop. Additionally, since the first and second modules remove a large portion of the particulates from the air, better depth loading is achieved throughout the filter assembly and thus a longer service interval may be achieved for the filter assembly. As noted above, by employing three distinct filter modules of increasing separation efficiency, it is possible to achieve a level of filtration that is greater than each individual filter module. By employing HEPA-grade media for the third filter module, it is possible to achieve ULPA-grade efficiency for the filter assembly.

The filter elements of the second and third filter modules may be pleated. The second and third filter modules comprise more restrictive filter elements that have higher separation efficiencies. By pleating the filter elements the surface area of the filter elements is increased. As a result, in spite of the more restrictive media, relatively high separation efficiencies may be achieved for a relatively low pressure drop.

The filter elements of the third filter module may have a pleat pitch smaller than that of the filter elements of the second filter module. By employing different pleat pitches for the second and third filter modules, the most effective surface area may be achieved for each filter module. Moreover, by employing a smaller pleat pitch for the third filter module, a relatively high separation efficiency may be achieved for a relatively low pressure drop, in spite of the more restrictive media used by the third filter module.

The filter elements of the first filter module may be non-pleated. Non-pleated media are generally capable of improved depth loading and a higher dust capacity. Additionally, through the use of graded media, it is possible to achieve an efficiency gradient through the media. By using non-pleated filter elements, the first filter module may be used to remove the bulk of particulates from the air for a relatively low pressure drop. The second and third filter modules, having the more restrictive filter elements, are then required to remove a smaller portion of particulates. As a result, the filter assembly is capable of achieving a relatively high separation efficiency for a relatively modest pressure drop.

The first filter module may comprise a further particulate filter element positioned downstream of the particulate filter element. The further particulate filter element then has a separation efficiency higher than the particulate filter element. The filter element has a higher dust capacity and acts to protect the further filter element by removing a larger portion of particulates from the air. The further filter element, which is more restrictive, is then required to remove a smaller portion of particulates in order to achieve the required separation efficiency. As a result, the first filter module is able to achieve good depth loading and a relatively low pressure drop.

Each filter module may comprise a frame to which the filter elements are secured, and each filter module may be mounted to the housing around the frame. This then simplifies the manufacture, assembly and disassembly of the filter assembly. In particular, each filter module may be manufactured using processes that are particular to each filter module. Assembly of the filter assembly then comprises inserting the individual filter modules into the housing, and the provision of frames aids in the handling of the filter modules. Additionally, by mounting the individual filter modules within a common housing, a single unitary filter assembly is achieved. As a result, servicing the various filter modules is made easier.

The present disclosure also provides a vehicle cabin filter assembly comprising a housing and a plurality of filter modules mounted to the housing, wherein: the plurality of filter modules comprises a first filter module, a second filter module positioned downstream of the first filter module, and a third filter module positioned downstream of the second filter module; the first filter module comprises a first particulate filter element and a second particulate filter element, the second particulate filter element being positioned downstream of the first particulate filter element and having a separation efficiency higher than the first particulate filter element; the second filter module comprises a gas filter element sandwiched between a first particulate filter element and a second particulate filter element, the second particulate filter element being positioned downstream of the first particulate filter element and having a separation efficiency higher than the first particulate filter element; the third filter module comprising a particulate filter element; the second filter module has a separation efficiency higher than the first filter module; and the third filter module has a separation efficiency higher than the second filter module.

The filter elements of the first filter module may be non-pleated, and the filter elements of the second and third filter modules may be pleated. Non-pleated media are generally capable of improved depth loading and a higher dust capacity. By using non-pleated filter elements, the first filter module may be used to remove the bulk of particulates from the air for a relatively low pressure drop. The second and third filter modules, having the more restrictive filter elements, are then required to remove a smaller portion of particulates. Moreover, by pleating the filter elements of the second and third filter modules, the surface area of the filter elements is increased. As a result, in spite of the more restrictive media, relatively high separation efficiencies may be achieved for a relatively low pressure drop. As a result, the filter assembly is capable of achieving a relatively high separation efficiency for a relatively modest pressure drop.

The filter elements of the third filter module may have a pleat pitch smaller than that of the filter elements of the second filter module. By employing different pleat pitches for the second and third filter modules, the most effective surface area may be achieved for each filter module. In particular, by employing a smaller pleat pitch for the third filter module, a relatively high separation efficiency may be achieved for a relatively low pressure drop, in spite of the more restrictive media used by the third filter module.

The present disclosure further provides a vehicle comprising a cabin, an air duct assembly through which air is drawn and discharged into the cabin, and a filter assembly as described in any one of the preceding paragraphs, wherein the filter assembly is mounted within the air duct assembly and filters the air.

BRIEF DESCRIPTION OF THE FIGURES

In order that the present disclosure may be more readily understood, embodiments of the disclosure will now be described, by way of example, with reference to the accompanying drawings, in which.

DETAILED DESCRIPTION OF THE DISCLOSURE

Figure 1:
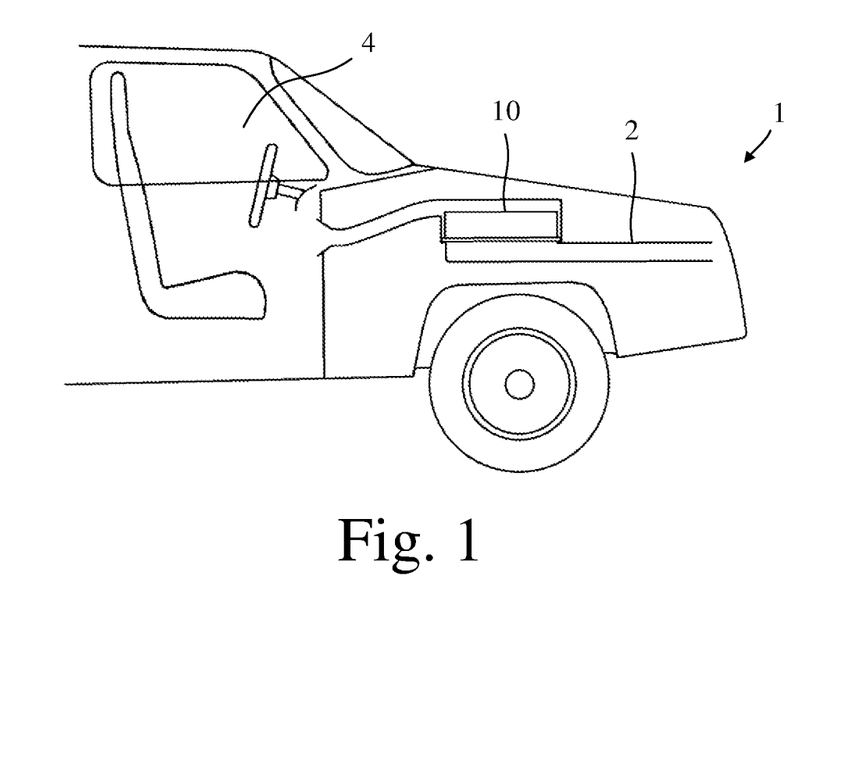
FIG. 1 is an illustrative view of a vehicle comprising a filter assembly, according to some embodiments.
Figure 2:
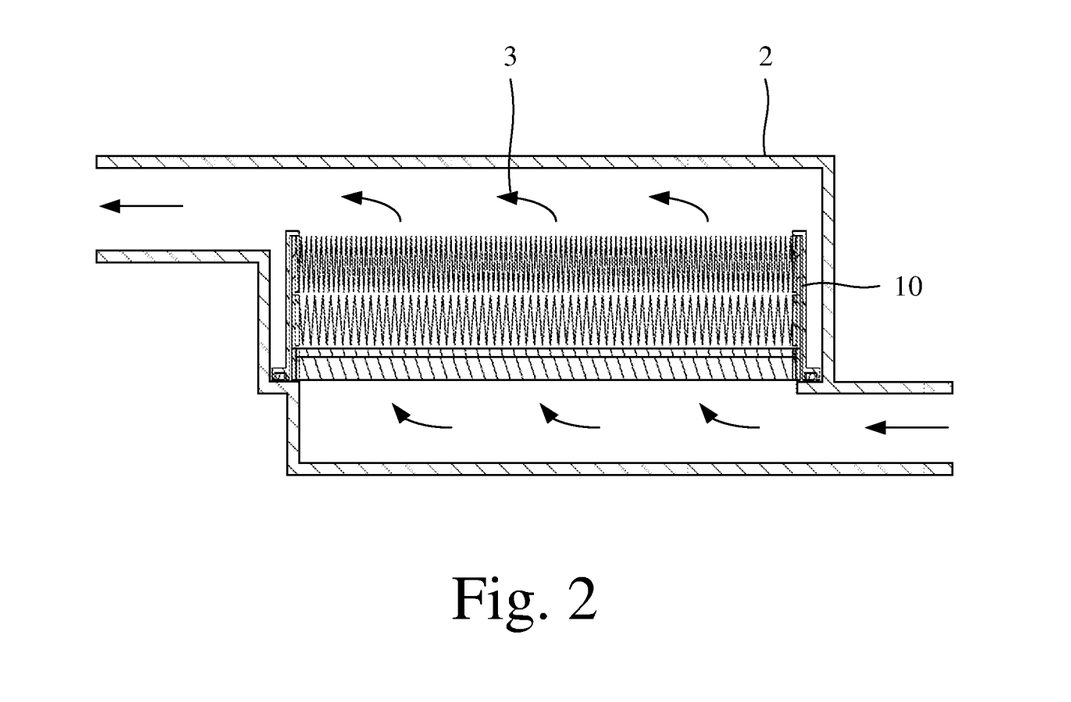
FIG. 2 is an illustrative view of a section through the filter assembly and an air duct assembly of the vehicle, according to some embodiments.
Figure 3:
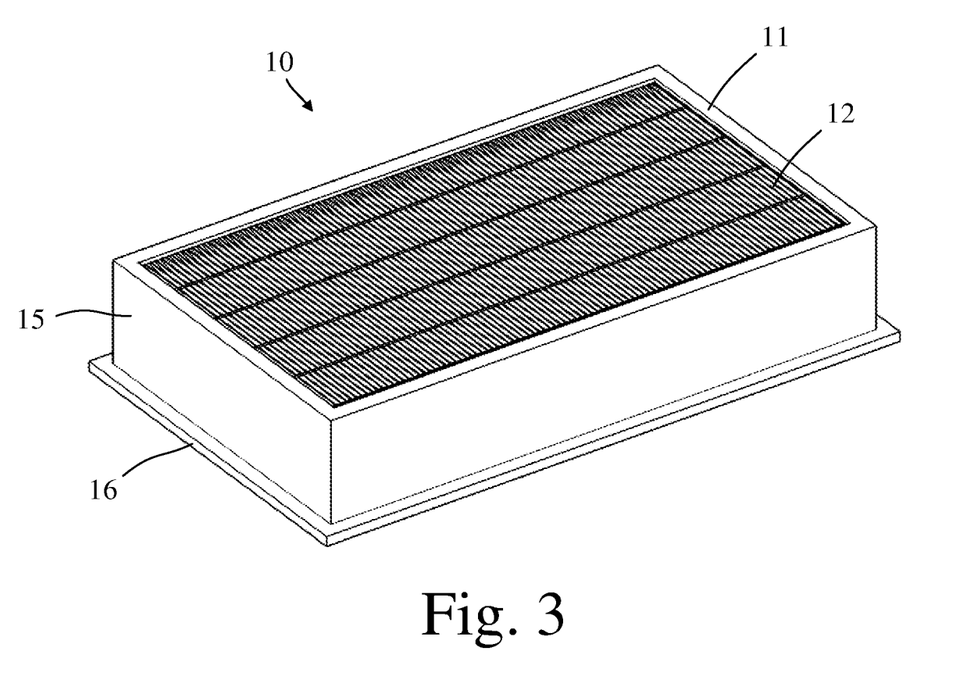
FIG. 3 is a perspective view of the filter assembly, according to some embodiments.

The vehicle 1 of FIGS. 1 and 2 comprises an air duct assembly 2 through which outside air 3 is drawn and discharged into a cabin 4 of the vehicle 1. The vehicle 1 further comprises a filter assembly 10 mounted within the air duct assembly 2 for filtering the air 3.

Referring now to FIGS. 3 to 6, the filter assembly 10 comprises a housing 11, a set of filter modules 12 mounted within the housing 11, and a sealing element 13.

The housing 11 comprises a rectangular body 15, a flange 16 that extends outwardly from a bottom end of the body 15, and a lip 17 that extends inwardly from a top end of the body 15. The filter modules 12 are mounted to the body 15, which provides structural support for the filter modules 12. Additionally, by mounting the filter modules 12 to the housing 11, a unitary structure is achieved and thus handling of the filter assembly 10, including insertion and removal of the filter assembly 10 from the air duct assembly 2, is made easier.

The sealing element 13 is seated within a groove 18 formed around the flange 16 of the housing 11. As shown in FIG. 2, when the filter assembly 10 is mounted within the air duct assembly 2, the sealing element 13 provides a seal between the flange 16 and a wall of the air duct assembly 2. In some embodiments, the sealing element 13 forms part of the filter assembly 10. However, the sealing element 13 might alternatively form part of the air duct assembly 2. Moreover, the flange 16 may be omitted and the body 15 of the housing 11 may seal against the sealing element 15.

The set of filter modules 12 comprises a first filter module 20, a second filter module 30 and a third filter module 40. The second filter module 30 is positioned downstream of the first filter module 20 and has a separation efficiency higher than the first filter module 20. The third filter module 40 is positioned downstream of the second filter module 30 and has a separation efficiency higher than the second filter module 30. The terms 'upstream' and 'downstream' are used with reference to the direction of the air 3 moving through the filter assembly 10, as shown in FIG. 2.

Each filter module 20, 30, 40 comprises a frame 21, 31, 41, one or more filter elements 22, 32, 42 secured to the frame, and a sealing element 23, 33, 43 provided around the outside of the frame. When positioned within the housing 11, the sealing element 23, 33, 43 provides an airtight seal between the respective filter module 20, 30, 40 and the housing 11.

The first filter module 20 comprises two filter elements 25, 26 formed of a nonwoven material. The filter elements 25, 26 are planar in form and extend in a direction perpendicular to the direction of the airflow 3 through the filter assembly 10. The filter elements 25, 26 have different separation efficiencies or filtration classes. The second filter element 26 is positioned downstream of the first filter element 25 and has a higher separation efficiency. For example, the first filter element 25 may comprise G-class filter media and the second filter element 26 may comprise M-class filter media. In some embodiments, the first filter element 25 may be a G3-class fleece sheet, and the second filter element 26 may be an M6-class fleece sheet. The filtration classes discussed herein are based on the EN779 and EN1882 standards.

The second filter module 30 is a dual function filter module, and comprises one or more filter elements for removing particulates and one or more filter elements for removing gases. In some embodiments, the second filter module 30 is a pleated assembly comprising first and second particulate filter elements 35, 36 that sandwich a gas filter element 37. The second particulate filter element 36 is positioned downstream of the first particulate filter element 35 and has a higher separation efficiency. By way of example, the first particulate filter element 35 may have a separation efficiency and pressure drop characteristic of between F7 and F9, whereas the second particulate filter element 36 may have a separation efficiency and pressure drop characteristic of between E10 and E12. The gas filter element 37 comprises granules of an adsorbent. For example, the gas filter element 37 may comprise granules of activated carbon, zeolite and/or a polymeric adsorbent. The gas filter element 37 may comprise a single adsorbent (e.g. to target a particular chemical substance) or a variety of adsorbents (e.g. to target different chemical substances). Granules have at least two advantages over other forms of adsorbent media, such as a cloth or sheet. First, a higher surface area may be presented by the adsorbent to the air 3 moving through the gas filter element 37. Second, a longer dwell time (i.e. the period of time during which the air 3 is in contact with the adsorbent) may be achieved. Accordingly, a higher separation efficiency may be achieved for a given pressure drop.

The gas filter element 37 may be secured to one or both of the particulate filter elements 35, 36 so that it is immobilised between them, which aids the folding process during manufacture. In some embodiments, the gas filter element 37 is secured only to the first particulate filter element 35. This may be achieved in a number of ways. For example, the gas filter element 37 may be formed by depositing adsorbent granules coated with a binder onto the particulate filter element 35. Alternatively, the gas filter element 37 may be provided as a sheet (e.g. adsorbent granules bonded to a support layer) which is then bonded to the particulate filter element 35. The first particulate filter element 35 has a lower separation efficiency and is therefore less restrictive than the second particulate filter element 36. Consequently, by securing the gas filter element 37 to only the first particulate filter element 35, the gas filter element 37 may be immobilised without unduly increasing the pressure drop across the filter module 30.

Figure 6:
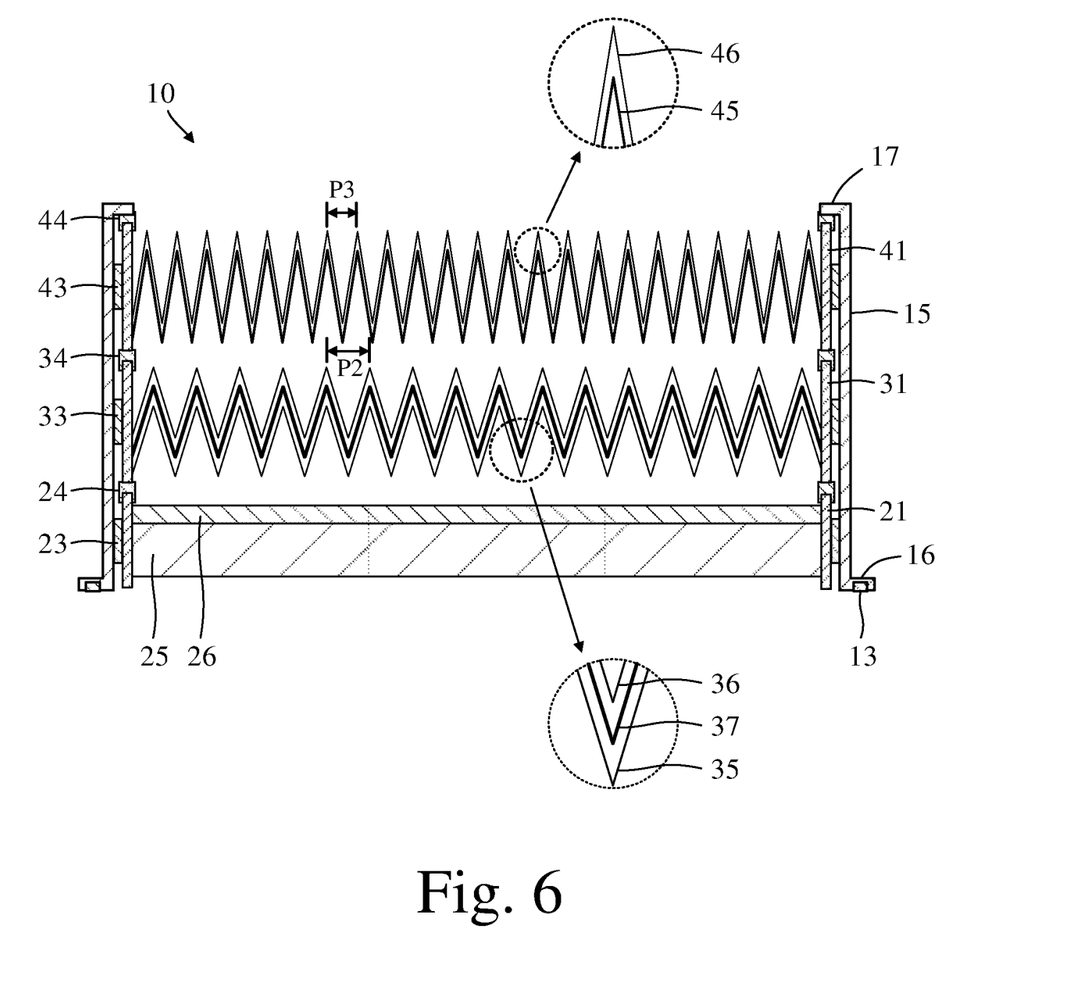
FIG. 6 is an illustrative view of a section through the filter assembly, according to some embodiments.

The third filter module 40 comprises a pleated filter element 45 formed of HEPA (High-Efficiency Particulate Air) grade media. It is envisaged that filter media having a filtration class of between E12 to U17 would be suitable. In some embodiments, the filter element 45 may be formed of an H13-class media. The third filter module 40 may comprise a support layer 46 that is associated with and provides stiffness to the filter element 45. As shown in FIG. 6, the filter element 45 and the support layer 46 are co-pleated, with the support layer 46 positioned on the downstream side of the filter element 45. The support layer 46 may be any suitable material that is capable of performing the function of providing stiffness to the filter element 45 without adversely restricting the airflow 3.

As already noted, the second and third filter modules 30, 40 each comprise pleated filter elements 35, 36, 37, 45. The filter elements 35, 36, 37, 45 are arranged so that the pleat directions of the two filter modules 30, 40 are parallel. The pleat pitch of the filter modules 30, 40 is, however, different. That is to say that the distance between adjacent pleats of the second filter module 30 is different to that between adjacent pleats of the third filter module 40. More specifically, the third filter module 40 has a smaller pleat pitch, and thus a higher pleat density, than the second filter module 30. In some embodiments, the pleat pitch P2 of the second filter module 30 may be between 5 and 9 mm, and more particularly between 6 and 7 mm, whereas the pleat pitch P3 of the third filter module 40 may be between 2 and 5 mm, and more particularly between 2.5 and 3.5 mm.

The second and third filter modules 30, 40 comprise media having different pleating requirements. For example, it is generally possible to pleat a particulate filter element at a smaller pleat pitch that that of a gas filter element. By employing different pleat pitches for the second and third filter modules 30, 40, the most effective surface area may be achieved for each filter module 30, 40. In particular, a smaller pleat pitch may be employed for the third filter module 40. By employing a smaller pleat pitch, a relatively high separation efficiency may be achieved for a relatively low pressure drop, in spite of the more restrictive media used by the third filter module 40.

As already noted, the filter modules 20, 30, 40 each comprise a frame 21, 31, 41 to which the filter elements 22, 32, 42 are secured. This then simplifies the manufacture, assembly and disassembly of the filter assembly 10. In particular, each filter module 20, 30, 40 may be manufactured using processes that are particular to each filter module. Assembly of the filter assembly 10 then comprises inserting the individual filter modules 20, 30, 40 into the housing 11, and the provision of a frame 21, 31, 41 aids in the handling of the filter modules 20, 30, 40.

By mounting the filter modules 20, 30, 40 within a common housing 11, servicing of the filter assembly 10 is made easier. For example, the filter modules 20, 30, 40 may be mounted within the housing 11 in a manner that permits their removable. One or more of the filter modules 20, 30, 40 may then be removed from the housing 11 in order to clean or replace the filter module. Moreover, the filter modules 20, 30, 40 may be removed and cleaned using processes that are particular to each filter module. Additionally, where replacement of a filter module 20, 30, 40 is required, this may be achieved without having to replace the filter assembly 10 as a whole.

The filter assembly 10 may include one or more vibration-isolation mounts 29, 39, 49 located between adjacent filter modules 20, 30, 40 and/or between filter modules and the housing 11. As illustrated in FIG. 6, a vibration-isolation mount 29, 39, 49 is provided around the upper edge of the frame 21, 31, 41 of each filter module 20, 30, 40. Each mount 29, 39, 49 is formed of a resilient material such as rubber. During use, the filter assembly 10 may be subjected to significant vibration from the vehicle 1. The mounts 29, 39, 49 prevent the filter modules 20, 30, 40 from knocking against one another and/or the housing 11. As a result, noise arising from vibration of the filter assembly 10 is reduced and the lifespan of the filter modules 20, 30, 40 is potentially increased.

The filter assembly 10 comprises three distinct filter modules 20, 30, 40 of increasing separation efficiency. As a result, it is possible to achieve a level of filtration for the filter assembly 10 that is greater than each individual filter module. For example, in some embodiments, the filter modules 20, 30, 40 are collectively capable of providing ULPA (Ultra-Low Particulate Air) grade efficiency. In addition to a high separation efficiency, the provision of distinct filter modules 20, 30, 40 of increasing separation efficiency provides good depth loading. As a result, the filter assembly 10 is able to achieve a relatively high separation efficiency and dust-loading capacity for a relatively modest pressure drop. The pressure drop across the filter assembly 10 is clearly an important consideration since a higher pressure drop will require a more powerful blower unit in order to achieve a given flow rate of air 3 into the cabin 2.

The first filter module 20 is responsible for removing larger particulates and comprises a first filter element 25 having a comparatively high dust capacity, and a second filter element 26 having a comparatively high separation efficiency. The combination of the two filter elements 25, 26 therefore provides good depth loading. The second and third filter modules 30, 40 employ more restrictive filter elements 32, 42 that have higher separation efficiencies. However, by pleating the filter elements 32, 42, the surface area of the filter elements 32, 42 is increased. As a result, in spite of the more restrictive media, relatively high separation efficiencies can be achieved for a relatively low pressure drop. In addition to removing particulates for the air 3, the filter assembly 10 also adsorbs gases, such as volatile organic compounds, by virtue of the gas filter element 37.

The filter elements 22, 32, 42 of each filter module 20, 30, 40 are spaced from and do not physically contact the filter elements 22, 32, 42 of adjacent filter modules 20, 30, 40. As a result, the filter elements 22, 32, 42 are less susceptible to damage. Some filter media, particularly high efficiency media such as that used in the second and third filter modules 30, 40, are relatively sensitive and will damage easily. As already noted, the filter assembly 10 may be subjected to significant vibration during use of the vehicle 1. If the filter elements 22, 32, 42 of adjacent filter modules 20, 30, 40 were in contact, the surface abrasion that arises from relatively movement of the filter elements 22, 32, 42 may damage one or more of the filter elements 22, 32, 42. Even if the filter elements 32, 42 of the second and third filter modules 30, 40 were co-pleated, micro-abrasion between filter elements 32, 42 is still likely to arise and damage the filter elements 32, 42.

If the second filter module 30 or the third filter module 40 is considered in isolation, the flow rate of the air 3 moving through the pleated filter elements 32, 42 is not uniform. Instead, the flow rate tends to be lowest at the peaks and valleys of each pleat, and highest at or near the centre of each pleat. When the second and third filter modules 30, 40 are considered in combination, a situation may arise in which a peak of the second filter module 30 aligns with a valley of the third filter module 40. Where the two align, a region is created where the flow rate of the air 3 moving through the filter modules 30, 40 is lower and thus dust loading is reduced. This uneven loading of the filter modules 30, 40 then reduces the dust capacity of the filter assembly 10.

Figure 7:
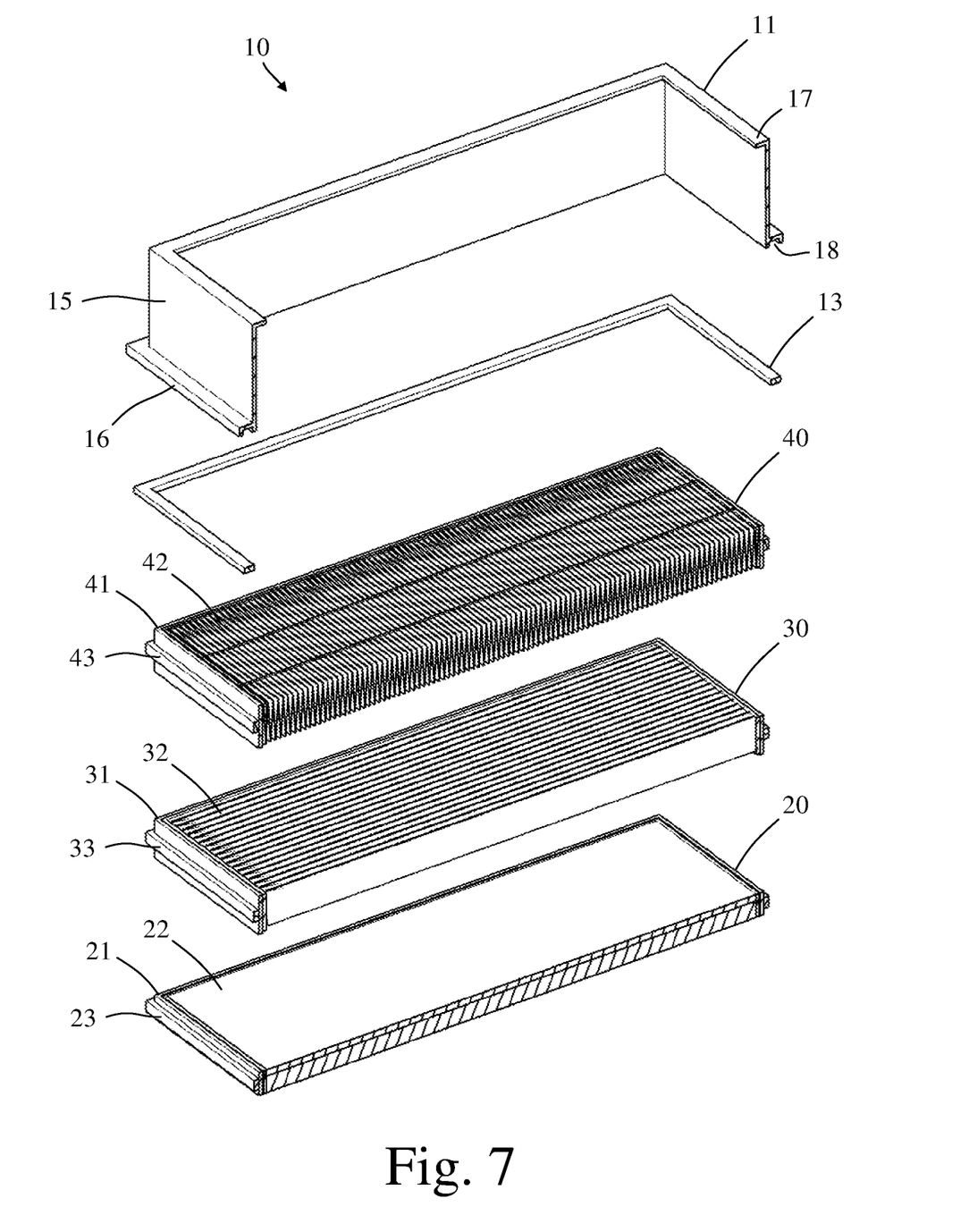
FIG. 7 is an exploded perspective view of a section through an alternative filter assembly, according to some embodiments.

In some embodiments, the two filter modules 30, 40 have different pleat pitches. In addition to the advantages described above, this arrangement also helps to encourage more even loading of the filter modules 30, 40. Nevertheless, as can be seen in FIG. 6, there are instances in which a peak of the second filter module 30 aligns with a valley of the third filter 40. FIG. 7 illustrates an embodiment of the filter assembly 10 that may alleviate this problem.

Figure 4:
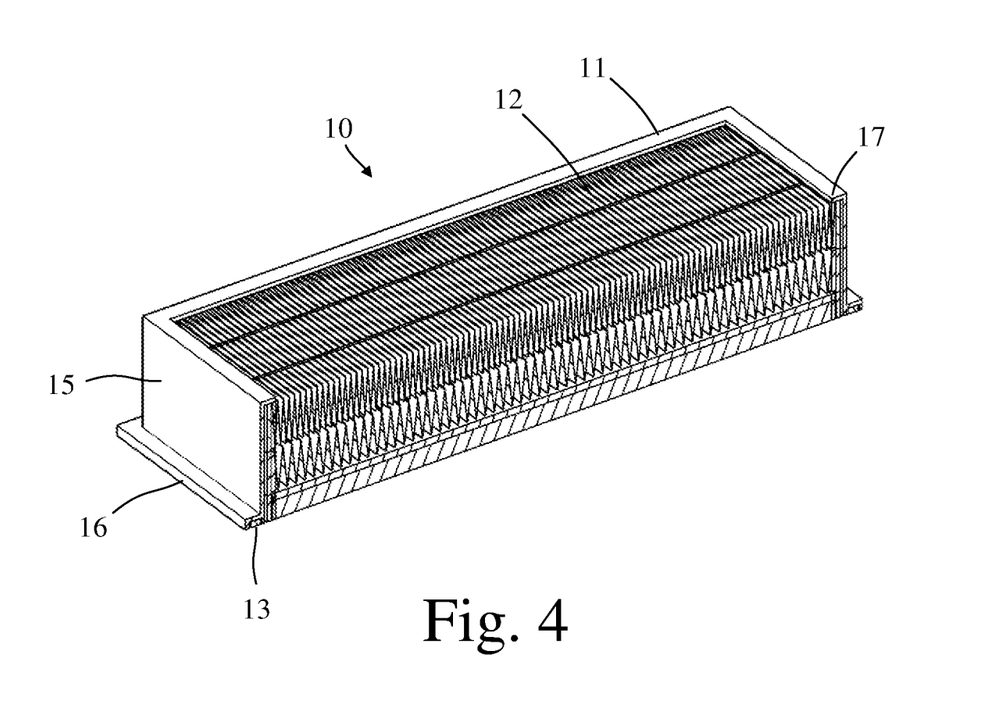
FIG. 4 is a perspective view of a section through the filter assembly, according to some embodiments.
Figure 5:
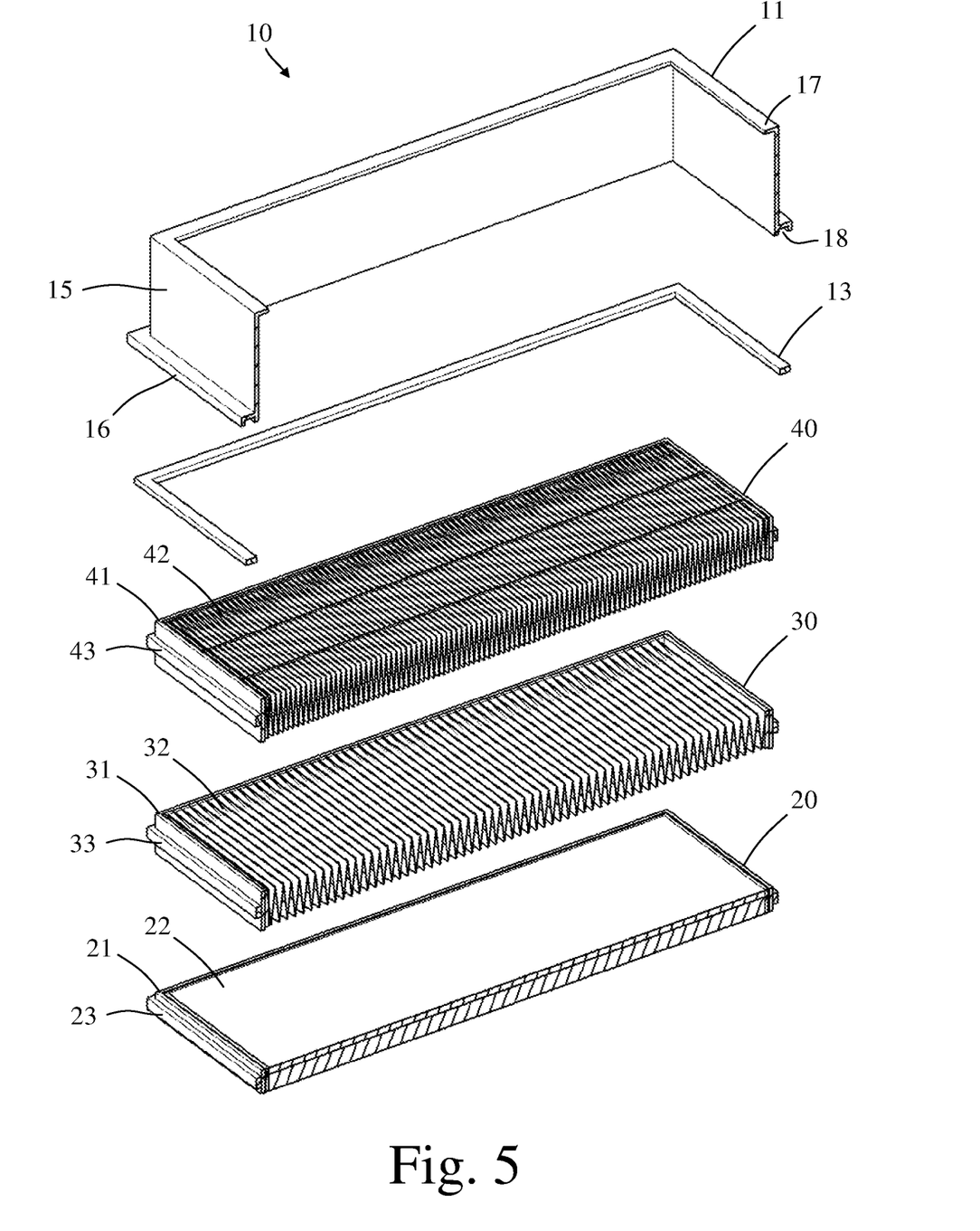
FIG. 5 is an exploded perspective view of a section through the filter assembly, according to some embodiments.

With the filter assembly 10 illustrated in FIGS. 4 to 6, the filter elements 32, 42 are arranged so that the pleat directions of the two filter modules 30, 40 are parallel. Consequently, when a peak of the second filter module 30 aligns with a valley of the third filter 40, a low flow region is created that extends along the full width of the filter assembly 10. With the filter assembly 10 of FIG. 7, the filter elements 32, 42 are arranged so that the pleat directions of the two filter modules 30, 40 are perpendicular. As a result, the peaks of the second filter module 30 align with the valleys of the third filter module 40 only at discrete points, i.e. at points where the peaks and valleys intersect. As a result, the flow of air 3 through the filter modules 30, 40 is likely to be more evenly distributed and thus a more even loading of the filter modules 30, 40 may be achieved.

Whilst the pleat directions of the filter assembly of FIG. 7 are perpendicular, improvements in the loading of the filter assembly of FIGS. 4 to 6 may be observed by orienting the pleat directions at other angles, so long as the pleat directions are non-parallel. That being said, the filter modules 30, 40 are rectangular in shape, and it is therefore relatively easy to orient and secure the filter elements 32, 42 within the frames 31, 41 such that the pleat directions are perpendicular.

Alignment of the peaks and valleys of the second and third filter modules 30, 40 may be avoided altogether by ensuring that the filter elements 32, 42 of the two filter modules 30, 40 have the same pleat pitch and pleat direction, and by ensuring that the pleats of the second filter module 30 are offset or shifted relative to the valleys of the third filter module 40. However, a disadvantage with this arrangement is that, by having the same pleat pitch for both filter modules 30, 40, the surface area of the third filter module is likely to be reduced.

Conceivably, the first filter module 20 may be omitted from the filter assembly 10 and the removal of larger particulates may be achieved by alternative means. For example, the vehicle 1 may include a filter module located upstream of the filter assembly 10. However, by having the first filter module 20 form part of the filter assembly 10, the vehicle 1 comprises a single unitary filter assembly 10 for filtering the air 3 that enters the cabin 4. As a result, servicing the various filter modules 20, 30, 40 is made easier.

In some embodiments, the filter assembly 10 comprises a housing 11 to which the filter modules 20, 30, 40 are mounted. Each filter module 20, 30, 40 then comprises a frame 21, 31, 41 to which the filter elements 22, 32, 42 are secured. The advantages of this arrangement, and in particular of providing each filter module with a frame, are described above. Nevertheless, in spite of these advantages, the frame 21, 31, 41 of one or more of the filter modules 20, 30, 40 may be omitted and the filter elements 22, 32, 42 may instead be secured directly to the housing 11.

The invention claimed is:

1. A vehicle cabin filter assembly comprising:
   a housing; and
   a plurality of separate filter modules mounted to the housing, comprising a first filter module, a second filter module, and a third filter module;
   wherein the second filter module is positioned inside the housing downstream of the first filter module, and a third filter module is positioned inside the housing downstream of the second filter module;
   wherein each of the first, second, and third filter modules respectively comprise a particulate filter element;
   wherein the particulate filter element of the second filter module has a particulate separation efficiency higher than the particulate filer element of the first filter module, and the particulate filter element of the third filter module has a particulate separation efficiency higher than that of the particulate filter element of the second filter module;
   wherein at least one of the first, second and third filter modules further comprises a gas filter element; and
   wherein the one of the first, second, and third modules that comprises the gas filter element further comprises a second particulate filter element, and the particulate filter element of the module that comprises the gas filter element is positioned upstream of the gas filter element, and the second particulate filter element is positioned downstream of the gas filter element, and the second particulate filter element has a separation efficiency higher than the particulate filter element of the module that comprises the gas filter element.

2. The filter assembly of claim 1, wherein the gas filter element comprises granules of an adsorbent.

3. The filter assembly of claim 1, wherein the particulate filter element of the third filter module comprises a HEPA-grade filter.

4. The filter of claim 1, wherein the particulate filter elements of the second and third filter modules are pleated.

5. The filter assembly of claim 4, wherein the particulate filter element of the third filter module has a pleat pitch smaller than that of the particulate filter element of the second filter module.

6. The filter assembly in of claim 4, wherein the particulate filter elements of the first filter module is non-pleated.

7. The filter assembly of claim 1, wherein the first filter module comprises a second particulate filter element positioned downstream of the particulate filter element, and the second particulate filter element has a separation efficiency higher than that of the particulate filter element of the first filter module.

8. The filter assembly of claim 1, wherein each filter module comprises a frame to which the particulate filter elements are respectively secured, and each filter module is mounted to the housing around the frame.

9. The filter assembly of claim 4, wherein the pleats of the particulate filter elements of the second and third filter modules are parallel with respect to each other.

10. The filter assembly of claim 1, wherein the respective filter modules are positioned within the housing such that any particulate filter element of a filter module is not in contact with a particulate filter element of a different filter module.

* * * * *